United States Patent [19]

Clocker et al.

[11] 3,951,850

[45] Apr. 20, 1976

[54] CONVERSION OF CLAY TO ITS COLLOIDAL FORM BY HYDRODYNAMIC ATTRITION

[76] Inventors: Edwin T. Clocker, 1343 N. Cleveland Ave., St. Paul, Minn. 55108; William Paterek, 146 S. Pierce, River Fall, Wis. 54022; Newton D. Farel, 2333 Farleigh Road, Upper Arlington, Ohio 43221; Michael J. Selsley, 1878 Knollridge Court, Columbus, Ohio 43229

[22] Filed: June 22, 1973

[21] Appl. No.: 372,569

[52] U.S. Cl. ............................. 252/313 R; 106/72;
252/28; 252/317; 252/378 R; 260/40 R;
423/328
[51] Int. Cl.² ........................................ B01J 13/00
[58] Field of Search ............ 252/317, 313 R, 378 R; 106/72; 423/328

[56] References Cited
UNITED STATES PATENTS

| | | | |
|---|---|---|---|
| 1,275,705 | 8/1918 | Laird | 106/72 |
| 2,091,548 | 8/1937 | Kauffman | 252/378 R X |
| 2,433,193 | 12/1947 | Bechtner | 252/317 X |
| 2,531,427 | 11/1950 | Hauser | 252/317 X |
| 2,920,832 | 1/1960 | Duke | 106/72 X |

Primary Examiner—Richard D. Lovering

[57] ABSTRACT

A colloidal clay is prepared by initially slurrying a clay material with water, heating the slurry, and commingling the slurry with steam to pressurize the slurry and hydrate the clay. Thereafter the pressurized slurry is rapidly expanded, as by jetting to an area of lesser pressure, to cause at least some colloidal particles to be formed of the clay. Next, and preferably, the clay is held in a holding zone for a time and at a temperature and pressure sufficient to optimize the formation of colloidal particles of the clay material. Thereafter, the colloidal particles are separated from the non-colloidal particles. The colloidal particles of clay so formed may be reacted with an "onium" base material to form a colloidal organophilic clay material useful as a gelling and/or suspension agent.

2 Claims, 5 Drawing Figures

FIG. 3

CONVERSION OF CLAY TO ITS COLLOIDAL FORM BY HYDRODYNAMIC ATTRITION

Various clays are found in nature, which clays are basically noncolloidal since they are made up of a series of layered colloidal particles held together by relatively weak bonds. Colloidal clays, as opposed to noncolloidal clays, are highly desirable in many industries and for many uses. For example, such clays may be employed as gelling or suspension agents in various aqueous or nonaqueous media. The necessity of providing a colloidal particle rather than a noncolloidal particle is well known in the industry and is usually based upon the need for high dispersibility and stability of either the gel or the suspension in which the particle is employed.

One of the most prevalent forms of these colloidal clays are the "onium" modified clays which generally comprise a naturally occurring clay base exchanged (chemically reacted) with certain organic compounds generally designated in the art as "onium" compounds. In such a reaction the metal clay cation will base exchange with the radical of the organic compound to form an organic onium base clay. This reaction so modifies the surfaces of the clay particles that the clay may be made further reactable to other organic compounds, or, employed in its own form, as a thickener, gelling agent or suspension agent for polar and nonpolar organic fluids. Such clays are also common ingredients in lubricating oils and greases. Furthermore, these clays are often used as improved suspending agents for both polar and nonpolar paint vehicles as well as in automobile undercoating applications.

As stated above, in order to assure that the gel, suspension, or other media in which these clays are presented, exhibits the highest dispersibility and stability characteristics, the clay particles in whatever form employed should be colloidal. Generally speaking, particles are considered "colloidal" for most purposes if they have a particle size of less than about 0.5 microns. As further discussed above, naturally occurring clays, either alone or in their reacted "onium" form do not normally come in colloidal form. Rather, the weak bonds between the colloidal particles which make them into aggregate clays must be broken in some way.

Exemplary of commonly employed physical or comminuting techniques for breaking the bonds between the colloidal particles in a clay particle aggregate are those techniques disclosed in United States Pat. Nos. Re. 25,965; 3,253,791; 3,307,790; and 3,348,778. Generally speaking, the techniques disclosed in these patents effect some type of grinding or comminuting either by shear or abrasion so as to break the bonds in the clay aggregate particle and thus form several colloidal particles therefrom.

Such techniques generally suffer from the need to employ very specialized, complex and expensive equipment. In addition, they often suffer from having low yield capabilities. Furthermore, many require inordinate amounts of heat and mechanical energy or both in order to effect even acceptable efficiencies and reproducibility. Thus, the employment of physical means to achieve colloidal clay particles has been somewhat less than ideal and in fact, in many instances is considered undesirable.

Another technique employed to break the weak bonds and thus form colloidal particles of clay, and one that has proved somewhat successful, is that of hydration wherein water is forced into the clay aggregate breaking the bonds and forming colloidal particles. Hydration has been accomplished in several ways. For example, one technique employed is to merely soak the clays in water for a period of time sufficient to form colloidal particles. Another technique is to boil the water, thus increasing the rate of hydration and thus colloidal formation. Other techniques include such things as subjecting the clay to superheated steam in the hopes of increasing further the amount of colloidal particles formed. Examples of these well-known techniques are disclosed in U.S. Pat. Nos. 1,275,705; 2,231,328; 2,531,427 and Jordan, "Organophilic Bentonites", *J. Physics and Colloid Chemistry*, Vol. 53, pp. 294–306 (1949). These techniques while somewhat successful, usually result in relatively low yields of colloidal particles per unit of time.

Another technique employed to reduce the size of particles is what may be referred to as an "explosion" technique. In such a technique, fluid is forced into the pores of a large particle and then caused to suddenly expand, thus "exploding" the particle. Steam jet milling is an example of this technique and its use is exemplified by the disclosures in U.S. Pat. No. 2,983,453 and Canadian Pat. No. 589,819. In such a technique, material is saturated with water at atmospheric conditions and then subjected to higher temperatures to cause explosion. Generally speaking, however, such a technique has been thought inapplicable to water slurries and is usually employed only in combination with a grinding step. In addition, there is no indication that colloidal particles are achievable using only the explosion step. U.S. Pat. No. 3,352,498 is a further example of this "explosion" technique using a gas forced into the crevices of the particles and then expanding the gas to cause explosions (as by suddenly reducing the ambient pressure). Ores are used as the starting materials and there is no indication that colloidal particle sizes are achievable by this technique.

While several of these prior art techniques have proved somewhat successful in reducing particles to colloidal form, they generally have suffered from low yields or the need for extended periods to achieve moderate yields as in the case of the hydration technology, or must be used in combination with grinding as in the case of the hydration technology, or must be used in combination with grinding as in the case of the explosion technology. It is therefore evident that there exists a need in the art for a technique, method or process which can form colloidal clays either in their unmodified form or in their modified "onium" form, which process is efficient, results in high yields of colloidal clay, and at the same time does not require elaborate physical comminuting means, additional steps, expensive equipment and high energy input requirements to achieve the desired results.

It is a purpose of this invention to fulfill this need in the art, as well as other needs evident to the artisan once given the following detailed disclosure of the invention.

In accordance with its teachings, the present invention makes it possible to provide a clay highly ammenable to "onium" modification wherein substantially all of the clay particles are colloidal in size. The present invention thus makes it possible to prepare a readily dispersible organophilic clay which is highly stable in the dispersed form. The present invention, in addition, is adaptable to a relatively large number of clay materials, and can be carried out using simple, relatively inexpensive and conventional equipment and does not require a large amount of mechanical energy or inordinate amounts of heat to achieve its desired results. In addition, yields are quite high as compared with the prior art hydration techniques and there is no need for additional steps to reduce the particles to their colloidal form.

Generally speaking, the processes of this invention achieve these results by a technique which comprises initially slurrying a clay material with water, commingling the slurry with steam at an elevated pressure and rapidly expanding the commingled material at a reduced pressure and temperature sufficient to form at least some colloidal particles of the clay material, preferably next conducting the expanded material to a holding zone and therein holding the material at a temperature in the range of about 180°-270°F and at a pressure of about 0-25 psig, for a period of time sufficient to optimize (e.g., increase) the formation of colloidal particles of the clay, and thereafter separating the colloidal particles from the noncolloidal particles. Thereafter, the colloidal particles may be used in any known manner. In certain preferred techniques of this invention, the colloidal clay suspension so formed by the basic process is thereafter mixed with an "onium" modifier so as to cause a base exchange to take place therewith and thereby form an onium modified clay of excellent properties.

As stated above, the first step in the basic process of this invention is to slurry the clay with water. Despite negative teachings in the prior art to the contrary, this initial slurrying step is important to the ultimate outcome of this invention in that the same high yields are not achieved if the clay is merely commingled with the steam, in dried or unslurried form. In a particularly preferred embodiment of this invention, the slurry is heated prior to commingling it with steam, usually to a temperature somewhat less than the temperature of the steam. A preferred temperature range is from about boil to about 120°F.

The reason why this initial step of slurrying is important to the achievement of this invention is not entirely understood. It is believed, however, that such a step at least initiates hydration of the clay, which step when coupled with the step of commingling with steam insures optimized hydration. Thus when rapid expansion is caused to take place a maximized exploding as well as hydrating situation occurs, thereby achieving the unexpectedly high colloidal yields of this invention.

The next step in the process, steam commingling, may be carried out using any type of conventional equipment. As alluded to hereinabove, steam commingling is believed to serve two important functions. Firstly, it "pressurizes" the system so that expansion may take place merely by rapidly expelling the slurry (e.g., as by way of a conventional orifice such as jetting nozzle, needle valve or the like) to atmospheric pressure. Secondly, and particularly when superheated steam is employed, commingling optimizes hydration, thus to ensure the full effects of hydration particularly upon expansion.

The pressures and temperatures effected by commingling may vary over a wide range depending primarily on such factors as the type of clay being treated, the type of equipment used to effect commingling and the like. For most situations, as where a simple jetting nozzle is employed to treat the preferred clays hereinafter enumerated, a pressure of about 100-500 psig and preferably about 150-450 psig with a temperature of about 300°-470°F and preferably about 350°-450°F is usually found sufficient to insure the desired amount of hydration and effect a sufficiently elevated pressure for efficient expansion when the slurry is expelled to about atmospheric pressure (e.g. about 0-25 psig).

As alluded to hereinabove the expanding step may be effected by any conventional technique, the most convenient currently being a conventional jetting technique. Such a technique may employ a simple, conventional steam jet nozzle or other restricting orifice, the important consideration being that discharge or expelling of the slurry must result in rapid expansion of the material.

The holding step as hereinafter more fully discussed, is preferable, but may be optional. What will constitute sufficient residence time in the holding zone when it is employed will vary depending upon the type of clay employed, the pressure of the steam, and the like. Generally speaking, however, and for most purposes, a residence time of about 3 to 100 minutes when the holding zone is held within the temperature and pressure range given above, insures excellent colloidal formation with high yields.

The steam utilized in this steam commingling and expansion step may accompany the clay slurry into the holding zone or it may be expelled before the slurry reaches the holding zone. The steam and clay introduced into the steam commingling and expansion zone may, generally speaking, be supplied to the zone in any suitable ratio. Preferably the ratio of steam to clay is about 2 to 6 pounds of steam per lb. of clay.

The steps up to and through expansion are important to the achievement of this invention, since they cause at least some hydration and are believed to form a substantial number of colloidal particles, in some instances in sufficient amounts so that the holding step may be eliminated or minimized. On the other hand it is felt that without the holding step the unique results of this invention, in many instances, would not be optimally achieved. The reason for this is not exactly understood, but it is surmised that this additional holding step conducted within the basic ranges hereinabove given, achieves some sort of synergism with the commingling and expansion effect, thus to achieve an optimized hydration and explosion "reaction" which optimizes the yield of the colloidal particles in an unexpected way.

The slurry is generally held in this holding zone or step at a temperature of from about 180°-270°F for an average residence time of from about 3 to about 100 minutes. It has been found that for most purposes when the holding zone is carried out within these ranges, and generally held at a pressure of about 0-25 psig, excellent yields (of colloidal particles) are achieved. Yields appear to be further improved in many instances, if some or all of the commingled steam is allowed to remain in the holding zone. Thus it is preferred to maintain the holding zone under a positive pressure above atmospheric, and usually at about 1-15 psig.

The material from this holding zone may then be sent directly to the separation step wherein the colloidal particles are separated from the noncollidal particles by conventional techniques and dried or later reacted with an onium clay. This can be done by taking all of the material from the holding zone or, recycling some of the material back through the heated slurry and steam commingling-expansion steps to achieve further colloidalization. However, it has been found that this recycling step is not necessary, and in many instances may be an economic waste of effort in view of the relatively high yields which are achieved when conducting the process within the above-indicated parameters by a one-pass technique.

The separation step may be conducted by any known and conventional technique. Generally speaking the separation equipment employed should be that which is capable of separating a colloidal particle from a noncolloidal and nonhydratable particle. Colloidal particles are generally considered as those which have a particle size of something less than about 0.5 microns. Thus, in theory, simple sedimentation can be employed to separate the colloidal from the noncolloidal particles. However, such simple sedimentation is often quite time-consuming and inefficient, and thus, it is preferred to use actual separation equipment such as, for example: cyclone separators, centrifuges or a combination of both. In certain particularly preferred techniques of this invention, a combination of cyclones and centrifuges is employed to effect a rather efficient separation of these materials and to achieve a relatively high yield of colloidal particles (usually greater than about 50% of total clay content of the slurry).

The material so obtained is a colloidal particle useful as a swelling clay for many known end purposes. One particularly useful purpose to which the swelling clays of this invention may be put is to form an "onium" modified clay as that term is well known and used in the prior art. See for example, the discussions in U.S. Pat. No. 2,531,427 and Canadian Pat. No. 589,819 as referred to hereinabove.

Thus, in particularly preferred embodiments of this invention, a colloidal clay-water slurry is taken from the separation stage and reacted with an onium modifier to produce an onium modified clay. This can be accomplished, in preferred techniques, by conducting the colloid clay-water slurry to a reaction zone wherein the slurry is mixed with an "onium" modifier usually also in water slurry form.

Because many of the suitable onium modifiers are not readily flowable or pumpable at room temperature, it is often necessary to heat the modifier with water. Another step that may be taken to render the modifier readily flowable is to mix the modifier with relatively hot water. Or it may be desirable to take both steps in preparing the onium modifier.

Hot water may be independently supplied to the onium modifier processing step or water previously used for indirect heat exchange in other steps in the process of the invention, as is discussed later with reference to certain preferred embodiments, may be advantageously reused in the modifier processing step. Still another method to raise the temperature of the onium modifier, and thus make it more readily pumpable, is to heat the water used in the modifier processing step by injecting therein some of the steam used in the steam commingling zone. Regardless of how the modifier is prepared, it is pumped to the reaction zone wherein it is mixed with a colloidal clay slurry suspension to react therewith.

After the onium modifier reacts with the clay product in a known manner to form the onium modified clay product, the product is transmitted to a filter stage wherein the product is filtered, dried and ground. The thus formed "onium" modified clay product is then usually sent to a bagging or other packaging station for packaging the final onium modified clay product. The filtering in this step can be conducted using conventional filtering apparatus, for example, a rotary filter, a filter press, or both. The drying can be conducted in any suitable dryer such as, i.e., flash dryers.

Any of the "colloidal" clays well known in the art can be treated in accordance with this invention. Examples of these clays include the various structured silicates, predominately aluminum silicates, characterized by a sheet-like crystal structure. Such clay materials can, for the most part, be classified in three groups: the Kaolinite group, the Montmorillonite group, and the Potash clay group. The former group comprises such clay materials as kaolin, kaolinite, dickite, nacrite, and halloysite. The montmorillonite group comprises such clay materials as montmorillonite, bentonite, nontronite, saponite, hectorite, sauconite, and beidellite. The latter group comprises potash clays, variously called hydromica, hydrous mica, mica, illite, and glimmerton. This latter group is also intended to be inclusive of bravaisite and vermiculite.

Those clays most preferred for treatment according to the processes of this invention include the clay materials generally of the montmorillonite group and the potash clay group. All of the above clay materials may not be readily susceptible to onium modification. Thus, when a colloidal clay material produced according to this invention is to be modified with an onium modifier, certain of the clay materials are more preferred than others, this preferance usually being dictated by knowledge already present in the prior art. Those clays and their synthetic analogs most preferred for onium treatment according to the processes of this invention include montmorillonite, bentonite, fullers earth, hectorite, nontronite, saponite, sauconite, attapulgite, beidellite and illite.

Any of the well known "onium" modifiers may be used in the practice of this invention. Examples of these prior art materials are the "onium" compounds described in U.S. Pat. Nos. 2,622,987; 2,966,506; and 2,859,234. Thus, suitable organic compounds useful as modifiers in the process of the present invention are "onium" compounds which have substantial hydrophobic properties and which are capable of undergoing a base exchange type reaction with clay materials prepared in accordance with this invention. An "onium" compound is defined in Hackh's Chemical Dictionary, third edition as:

"A group of organic compounds of the type $RXH_y$, which are isologs of ammonium and contain the element X in its highest positive valence; as where X is pentavalent as in ammonium, phosphonium, arsonium and stibonium, where X is tetravalent as in oxonium, sulfonium, selenonium and stannonium compounds and where X is trivalent as in iodonium compounds; and that they may be considered addition compounds of oxonium, carbonium, stibonium, e.g. -inium, -ylium."

Organic ammonium salts are among the preferred types of "onium" compounds which can readily undergo a base exchange reaction with clays; this class of compounds includes by way of example and not by way of limitation the salts or primary, secondary, and tertiary amines, including mono- and poly-amines as well as aliphatic, aromatic, cyclic and heterocyclic amines;

a particularly useful class of onium compounds for preparing organic-modified clay complexes is the quaternary ammonium salts. Other monovalent or polyvalent "onium" compounds which are useful in the practice of this invention include triphenylalkyl phosphonium, arsonium and stibonium-halides, dialkyl or aryl sulphonium and selenonium halides as well as pyrones, such as 2,5-dialkyl gamma pyrone hydrochloride.

Specific examples of typical ammonium compounds which have been found useful in the practice of this invention include octadecyl ammonium chloride, hexadecyl ammonium acetate, dimethyldioctadecyl ammonium bromide, dodecyl ammonium chloride, dimethyloctadecylbenzyl ammonium chloride, N,N-dioctadecylmorpholinium chloride and 1-(2-hydroxyethyl)-2-dodecyl-1 benzyl-2 imidazolinium chloride. Any of the foregoing compounds can be used either by themselves or in combination to react with an ion exchange treated clay to produce an "onium" modified clay complex.

As previously indicated the preferred organic compounds useful in the practice of this invention are organic onium salts; however this invention is not to be restricted to the reaction of an onium salt with ion-exchanged clay but includes the composition formed by a free organic base and an ion-exchanged clay wherein the free organic base is capable of reacting with water to give an onium hydroxide which in turn combines with the ion-exchanged clay to produce an organic-modified clay composition, e.g.,

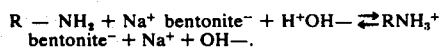

Also suitable are other organic amine type compounds which do not come within the strict definition of an "onium" compound but which do unite with the clay materials to impart organophilic properties thereto. In the interest of facilitating the description of and claiming of the present invention, such suitable materials as those discussed above will be referred to herein as onium modifiers. It should be remembered that any one of these materials or mixtures thereof are suitable for use in the instant process.

This invention will now be described with respect to certain particular embodiments thereof, particularly as they are illustrated in the accompanying drawings wherein:

IN THE DRAWINGS

FIG. 3 is a more complete flow sheet of the process of FIG. 2.

Figure 1:
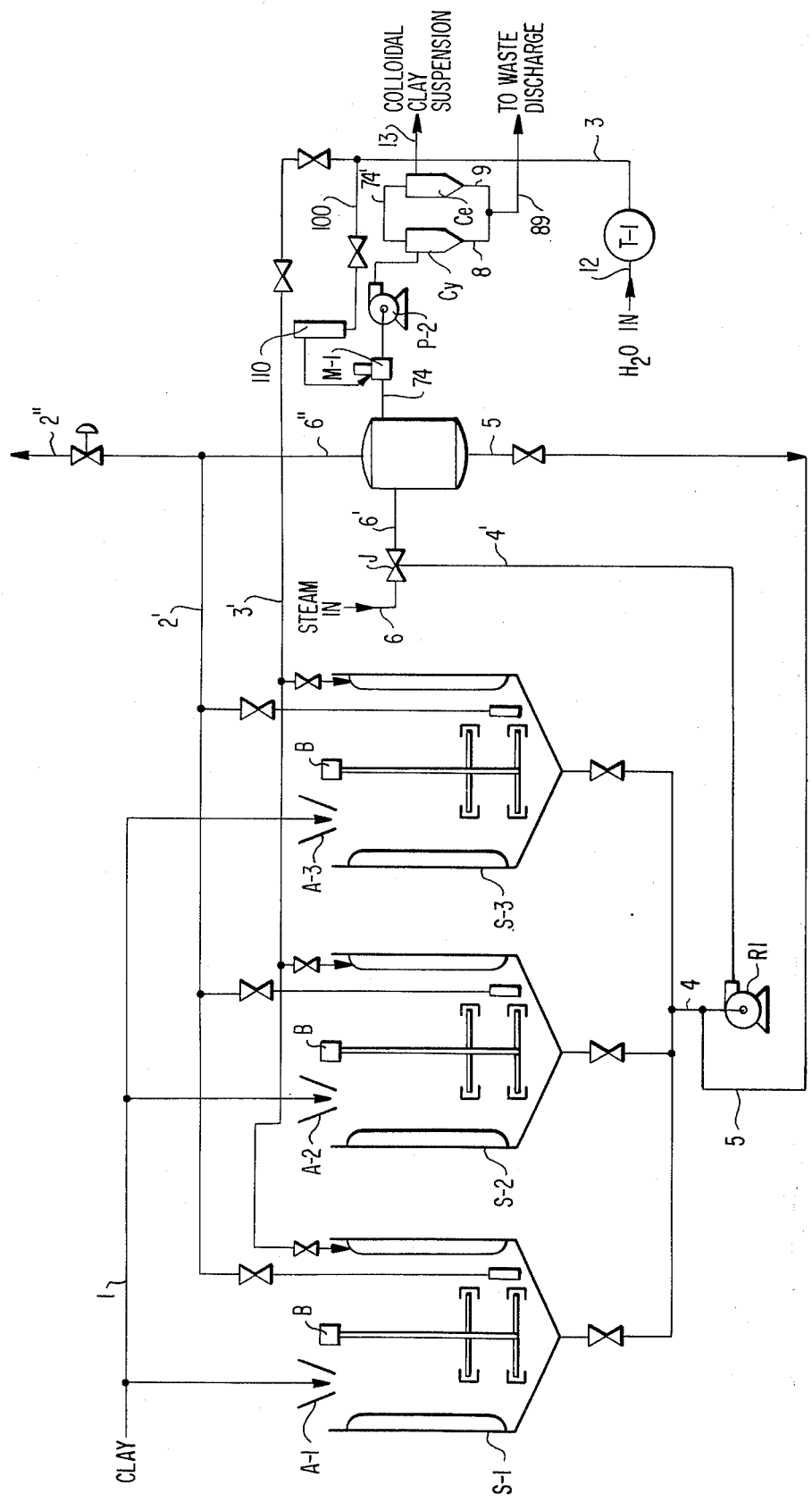
FIG. 1 is a flow sheet of a particularly preferred technique for preparing the colloidal clays according to the teachings of this invention.

Referring now to FIG. 1, a clay material such as sodium montomorillonite (usually in the form of a 200 mesh particulate material known as Wyoming bentonite) is supplied through line 1 and by way of hoppers A-1, 2 and 3 to slurry zones S-1, S-2 and S-3. Water is delivered to slurry zones S-1, S-2 and S-3, via line 3 and the slurry is held in suspension through agitators B of any conventional design.

In the embodiment illustrated in this Figure, the water is first passed through a water softener system T-1 by way of line 12 before it enters line 3. The purpose of this, of course, is to reduce mineral contamination in the ultimate system. The water and clay are supplied to the slurry tanks in any suitable proportions to form a processable slurry. Preferably, the clay material is added to the slurry tank so as to provide a slurry of about 2–20% weight of clay material. This slurry content is not critical and may be varied mainly for convenience. In addition, the clay particles can be of any size so long as the clay material can be worked up into a slurry. Preferably, the clay particles are of about 200 mesh (U.S. sieve size) or less.

The slurry may now be sent directly to the next step. However, and as discussed above, it is preferred for the purposes of this invention to heat the slurry first. The slurry in FIG. 1 is thus shown as capable of being heated by way of steam which is withdrawn from the holding zone later described. This is not critical, since of course, an independent heating source for the slurrying tank can be used.

The heated clay slurry is withdrawn from the slurrying tanks and carried by way of line 4 to pump P-1. From there the slurry is pumped to the steam commingling and expansion zone here illustrated as a conventional steam jet nozzle J. Such a nozzle effects little if any shear of the clay, but does provide excellent expansion features.

While the steam pressure is not thought to be ultimately critical to the process, it is felt that optimum results are obtained if the steam pressure is kept above about 150 psig. The upper limit of the steam pressure is mainly one of convenience which is generally determined to be about 450 psig. While the steam pressure can be regulated somewhat below 150 psig, it is believed that yield will not be as good if this is done.

The clay slurry material is carried to the steam jet nozzle J by way of line 4' and is metered into the vacuum side of the steam jet nozzle J at such a rate as to utilize the complete flow of steam but not at a rate which will overflow the steam consumption. The actual amount of steam in ratio to the amount of clay is not necessarily critical, the upper and lower limts being based more on practicality and convenience than necessity. Functionally speaking, the lower limit of the amount of steam employed should be that needed to cause the necessary hydration of the clay so as to effect the desired yield. The upper limit, will of course be dependent upon the amount of yield required and the economics of the system as a whole. Such factors will of course be governed by the pressure of the steam, the temperature of the steam, and the like. Generally speaking, however, a convenient range of steam is about 2–6 pounds of steam per pound of clay.

From the steam commingling zone, the steam and clay slurry are carried by way of line 6' to a suitable holding zone H-1. As discussed above, this holding zone appears to be important to the achievement of the optimum desired results of this invention. In this respect, and in particularly preferred embodiments of this invention, optimum and quite possibly synergistic results appear to be achieved, if the steam commingled slurry now expanded through jet nozzle J is held in this holding zone H-1 at a temperature of about 180°–270°F and preferably at about 200°F for a total residence time of about 3–100 minutes. It is also particularly preferred, that the pressure in holding tank H-1 be maintained at a pressure of about 0–25 psig usually regulatable through the maintenance of outlet steam such as through line 2".

As can be seen by reference to FIG. 1, steam is withdrawn from the holding zone by way of line 6" and is partially released into the atmosphere by way of line 2" while the remainder of the steam is carried to the slurrying tanks S-1, S-2 and S-3 by way of line 2' so as to heat the clay slurry. In this respect, and generally speaking, sufficient steam should be provided along with the other means of heating slurry tanks S-1, S-2 and S-3 to a temperature of approximately 120°–212°F. Such a range is not critical in that the temperature of this slurry prior to jetting can be any convenient temperature. It has been found however, that a temperature of about 120°–212°F (i.e., to boil or below) and preferably about 180°F aids in the optimization of ultimate yield. In this respect it should be noted that a short pre-boil (i.e., bringing the slurry to boil) is contemplated, but this is often found unnecessary to achieve the advantages of this invention and thus an undue expense.

From the holding zone, a portion of the hydrated clay slurry is pumped via line 74 using pump P-2 to a separation zone. The commingled clay slurry is preferably diluted with water which has been tapped as at 100 from line 3. A water meter 110 serves to measure the dilution rate. The dilution water and the commingled clay slurry are mixed by a suitable in-line mixer M-1.

The separation zone can consist of one or more cyclone separators, one or more centrifuges, or a combination of both. The preferred separation zone, as illustrated in FIG. 1, uses both types of separators. The steam commingled clay slurry enters the cyclone Cy by way of line 74. The coarse clay particles (nonhydrated particles remaining after the holding zone) from the slurry are withdrawn from the cyclone Cy via line 8 while the finer particles of the clay slurry are carried from the cyclone Cy by way of line 74' to a centrifuge Ce. In the centrifuge the remaining unhydrated clay particles in the slurry above about 0.5 microns in size are removed from the slurry via line 9. The two residues from the separation zone in lines 8 and 9 are carried from the separation zone to a waste discharge pond via line 89 while the colloidal clay suspension product is removed from the centrifuge via line 13. This separation may be conducted at elevated temperatures when and if desired.

In FIG. 1 there is illustrated a recycling line 5 which may be employed if it is desirable to recycle the slurry. For example, recycling may be employed if yields for any particular run are relatively low, or there is a loss of steam pressure, or the like. This is not usually necessary, however, and actually, in preferred forms, it is found to be within the law of diminishing returns with respect to the system as a whole.

Regardless of whether or not a recycle is employed, it is possible in accordance with this invention to provide a colloidal clay suspension product wherein the major part of the clay volume entering the system through line 1 has been converted to a clay particle of colloidal size. This is in dramatic contradistinction to the prior art. Generally speaking, in most prior art systems, given the same time lapse and without the employment of excessively expensive comminuting equipment, the yield of colloidal particles is substantially below 50%. On the other hand, and in accordance with this invention, the colloidal clay suspension product withdrawn from the separation zone by way of line 13 usually contains about 50–80% of the initial clay input in the form of colloidal sized clay particles.

Figure 2:
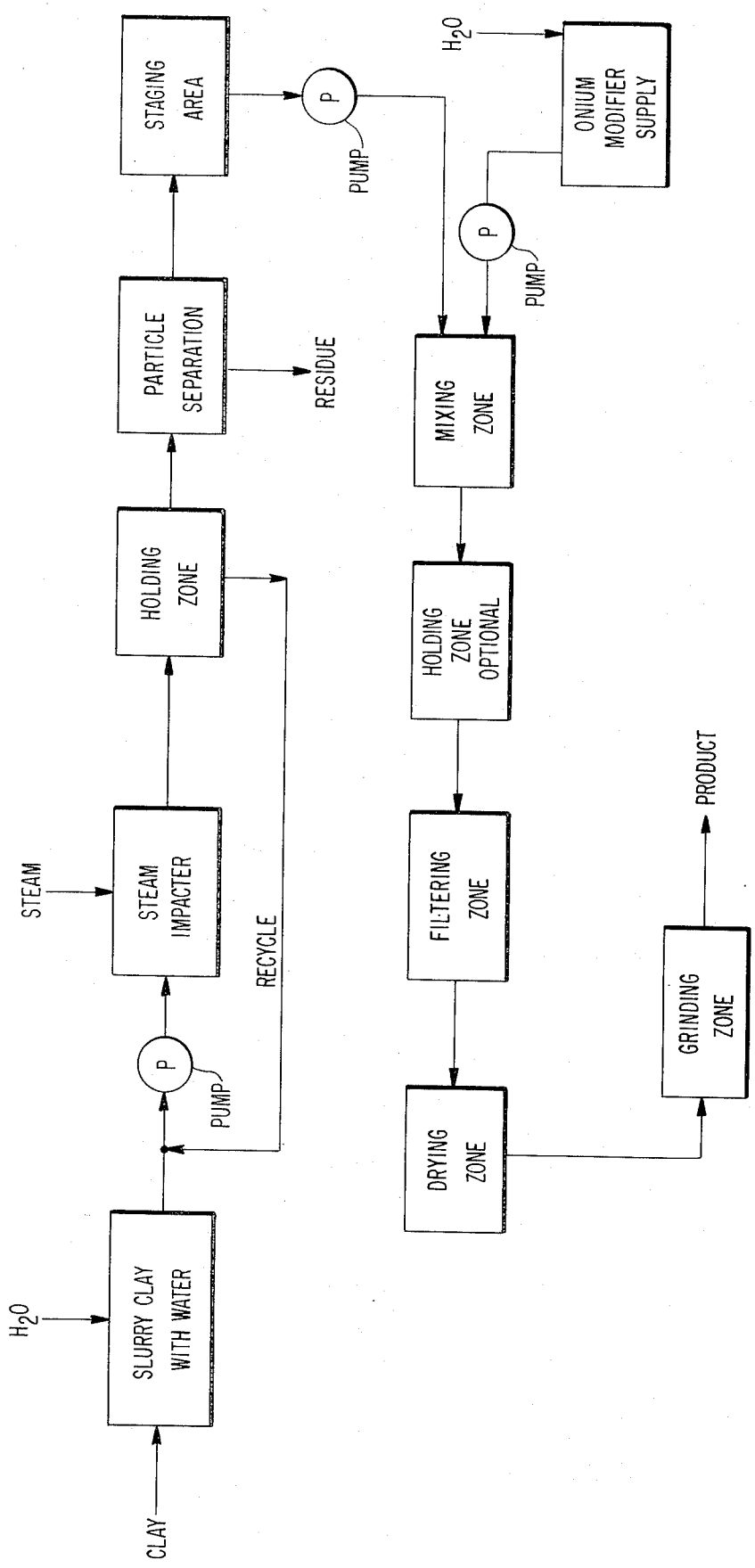
FIG. 2 is a block diagram of a process of preparing an "onium"-modified clay according to the subject invention.
Figure 3:
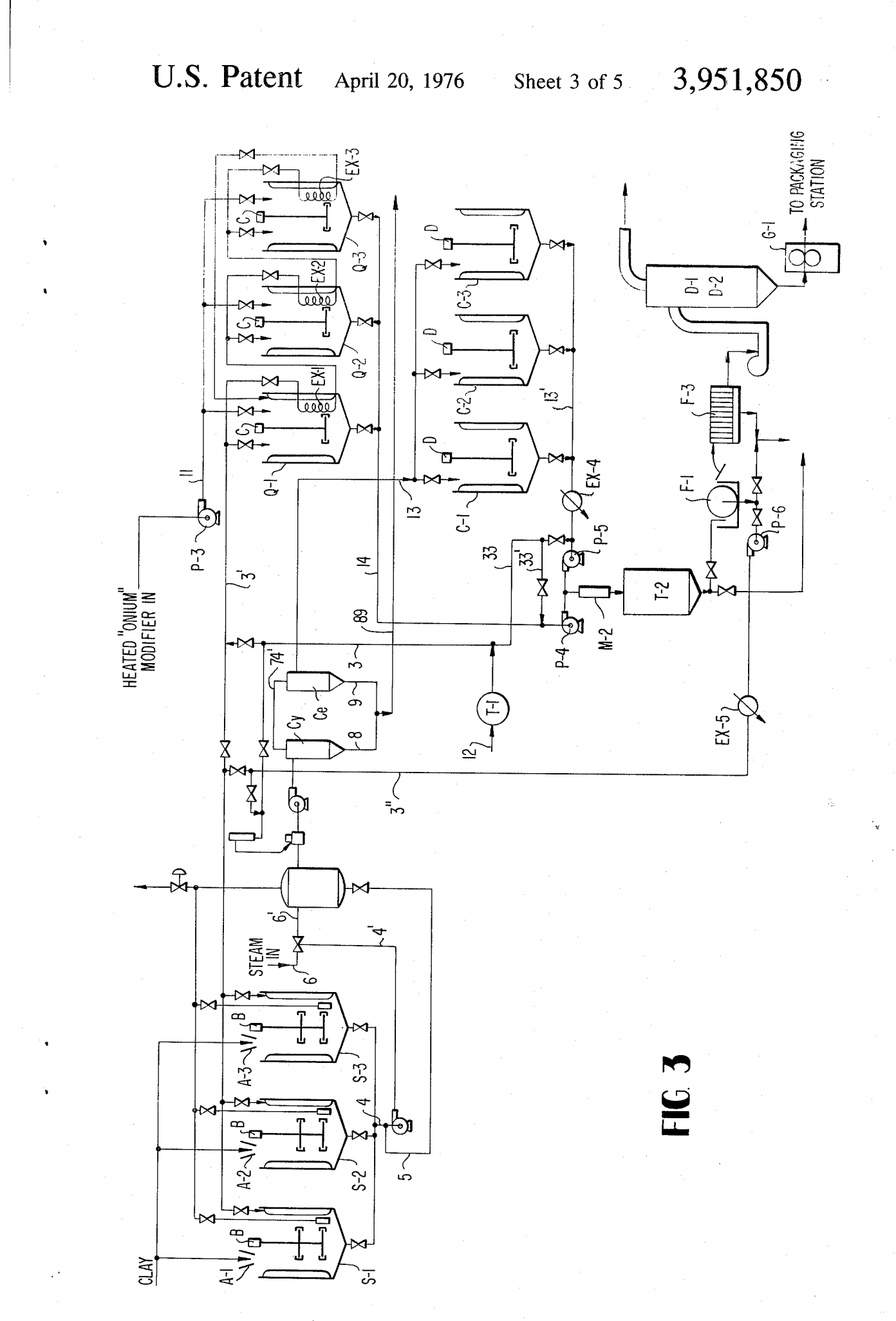

Reference is now made to FIGS. 2 and 3 which illustrate a particularly preferred process for preparing "onium"-modified clay materials according to the techniques of this invention. As is best illustrated in FIG. 3, a colloidal clay suspension, such as that prepared in accordance with the discussion of FIG. 1 hereinabove, is conducted by way of line 13 to a preliminary staging zone to await the admixture thereof with the onium modifier. This preliminary zone is illustrated as three tanks, C-1, C-2, and C-3, connected in parallel. The colloidal suspension is constantly agitated by way of stirrers D.

Any of the "onium" modifiers discussed hereinabove may now be prepared in accordance with the teachings of this invention. A particularly preferred one for use with the above-described sodium montmorillonite is dimethyl di(hydrogenated tallow) quaternary $NH_4Cl$. The onium modifier is prepared by pumping the modifier (which may require heating) through line 11 by way of pump P-3 to a mixing zone. The mixing zone is illustrated herein as three mixing tanks connected in parallel, Q-1, Q-2, and Q-3.

As the modifier is being pumped into the three mixing tanks, water, tapped from line 3 is carried to each of the three mixing tanks via line 3'. This water may be heated by injecting some of the steam from line 6" into line 3'. Each of the mixing tanks in the mixing zone is provided with a stirrer C to thoroughly mix the water and the modifier. A portion of the water from line 3' is introduced directly into the mixing tanks, while a second portion of the water from line 3' is introduced into the mixing tanks only after being cycled through a heat exchanger Ex-1, Ex-2, and Ex-3 respectively. It should be remembered that these heat exchangers may not be necessary to the process depending on whether or not the "onium" modifier or the water or both are preheated. If preheating does take place, then the exchangers are not necessary.

The onium modifier mixture and the colloidal clay suspension are conducted via their respective lines to the static mixture reaction zone M-2. For example, the modifier mixture is conducted via line 14 to static mixer M-2 by way of metering pump P-4 while the colloidal clay suspension is conducted via line 13' to the static mixer M-2 by way of metering pump P-5. A heat exchanger Ex-4 may be inserted in line 13' to cool down the colloidal clay suspension. The water for heat exchanger Ex-4 may be supplied from an independent source or it may be tapped from line 3 which carries slurry water to the slurrying tanks S-1, S-2 and S-3. As a result of the indirect heat exchange in Ex-4, the colloidal clay suspension will be cooled down and the water will be correspondingly heated. The heated water from exchanger Ex-4 may be put to efficient use by reusing same for heating the "onium" modifier in tanks Q-1, Q-2, and Q-3. This can be done by injecting the water from exchanger Ex-4 into line 3' for subsequent mixing with the onium modifier.

Flush water may be tapped from line 3 and carried to the colloidal clay metering pump P-4 as well as to the modifier metering pump P-5 via lines 33 and 33' respectively, and then through the static mixer M-2.

From static mixer M-2, the mixture of the onium modifier and the colloidal clay suspension, is carried to a holding tank T-2, wherein the reaction (onium base exchange) is completed so as to render the clay suspension a modified hydrophobic colloidal clay flocculent.

From holding tank T-2 the mixture is gravity fed to a rotary drum filter F-1. The water withdrawn in the rotary drum filter is conducted to line 3'' while the filtered product, in thickened slurry form, is carried to a filter press F-3. The water withdrawn in the filter press is also conducted to line 3''. The water from the filter system is pumped through line 3'' by pump P-6 back into line 3' so that the water can be reused in making up more of the initial clay slurry at the beginning of the process. A heat exchanger Ex-5 may be inserted in line 3' to cool down the water from the filtering system. As with heat exchanger Ex-4 the water to heat exchanger Ex-5 may be supplied independently or tapped from line 3.

The filtered product is taken from the filter press F-3, as a filter cake, to a suitable dryer (or preferably a plurality of dryers) as designated D-1 and D-2, so as to dry and recover the "onium" modified clay product via line 19. Finally, the clay product may be ground in grinder G-1, to break up the dried agglomerates and sent from there to a final packaging station.

Figure 4:
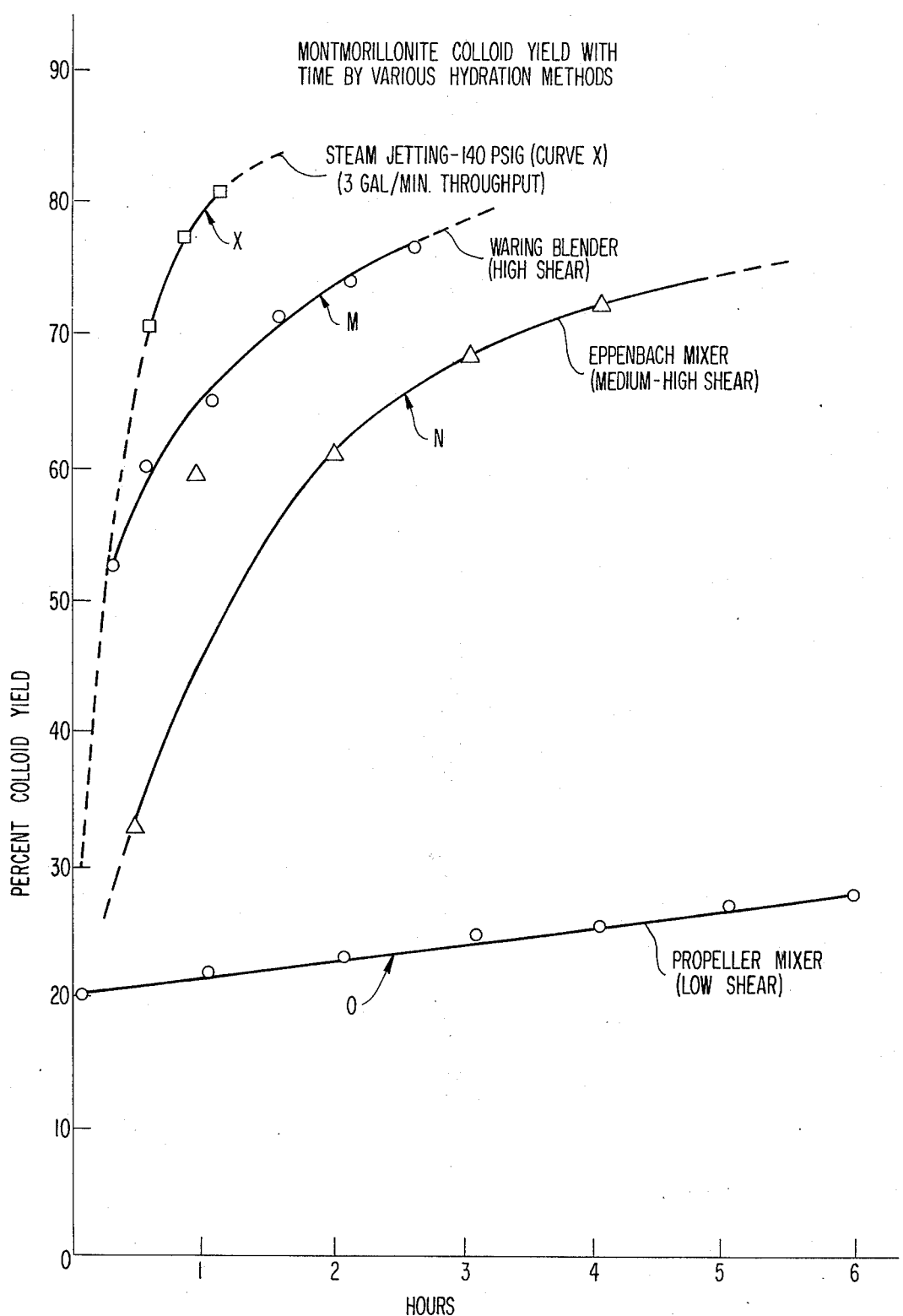
FIG. 4 illustrates the improved colloid yield of the subject invention over certain prior art techniques.

As stated above the processes of the present invention provide for higher and/or quick conversion rates of clay particles to particles of a colloidal size than even certain of the conventional shearing processes. This improvement is illustrated by the graph in FIG. 4 which compares percent colloid yield to mixing time for a number of processes including that of the invention as illustrated by curve X, and 3 others (curves M, N and O) of the prior art at various shear rates, the third being a "low shear" and basically a conventional boiling water hydration technique. The test was conducted by preheating a 5% Bentonite slurry to boil at atmospheric pressure, then subjecting it for the indicated periods of time to the stated process, whereinafter percent colloid yield was measured.

Figure 5:
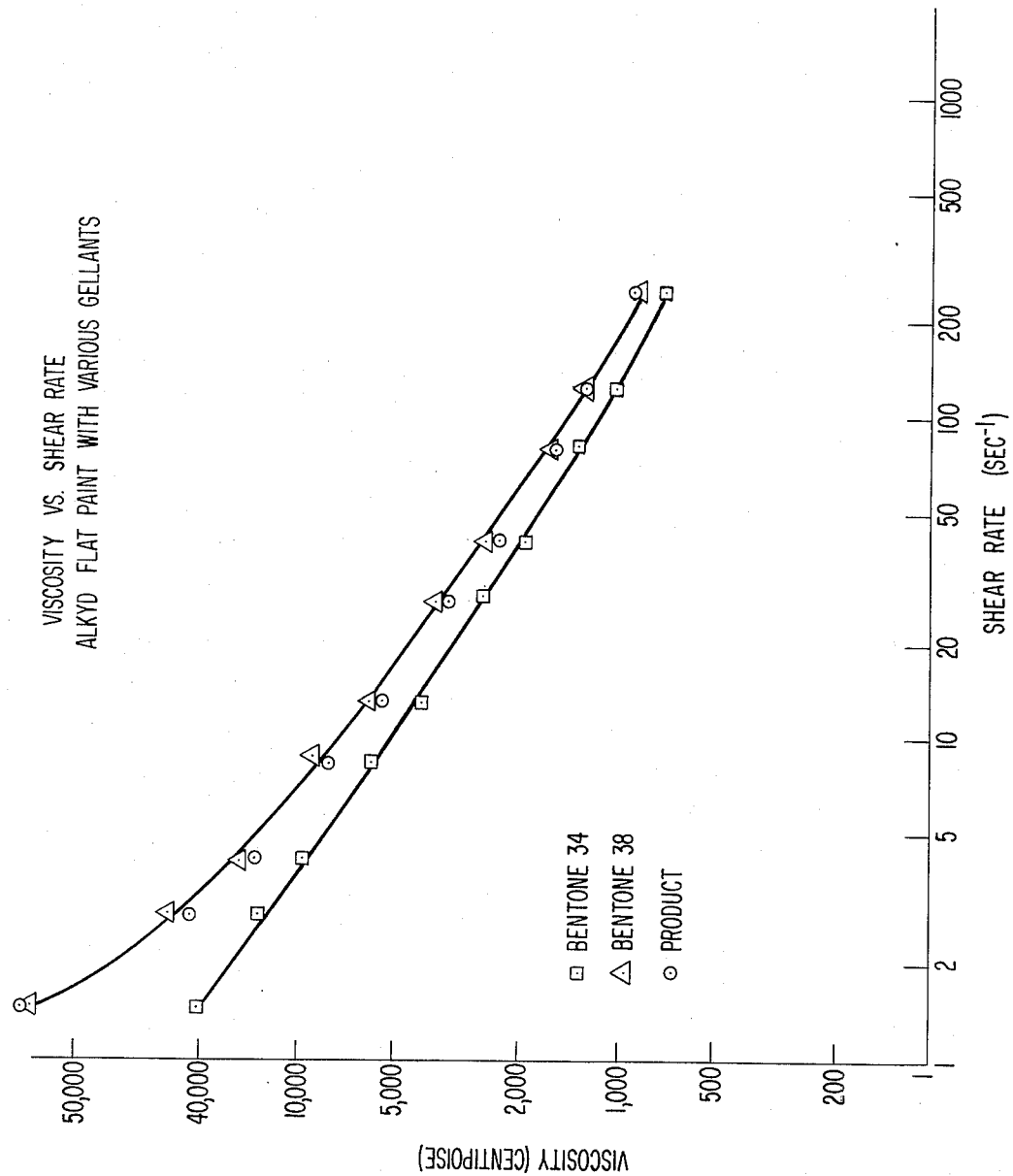
FIG. 5 illustrates the comparable properties of 3 products, 2 of which are substantially identical in chemical composition, one product prepared according to the present invention and two prepared according to a conventional prior art process generally believed to be less efficient than that of the subject invention.

The "onium" modified clay product of this invention exhibits equally as good, and in certain instances improved properties when compared to the modified clays formed by the prior art processes which employ hydration to obtain colloidal size. For example, as shown in FIG. 5, there is presented a comparison with two clays, Bentone 34 and 38, manufactured by National Lead Company when used as a gellant in a typical alkyd resin paint formulation in like amounts. Bentone 34 and 38 are two of the most popular (largest selling) onium modified clay products on the market today and are believed to be produced generally in accordance with the boiling water technique (i.e., substantially no shear) of the prior art as hereinabove described.

The product of the present invention [i.e., that as produced in accordance with the above-described techniques from sodium montmorillonite base exchanged (90 meg/100 g clay) with the dimethyl dihydrogenated tallow quaternary NH$_4$Cl] compared microscopically with Bentone 38, has a finely uniform grain while Bentone 38 has a significant portion of coarse particles. The arithmetic mean diameter of Bentone 38 is about 9.52 microns while the arithmetic mean diameter of the aforementioned product of this invention is 6.37 microns. The BET surface area determination for Bentone 38 is 4.5 m$^2$/g, while that of the instant product is 15 m$^2$/g.

Bentone 34 is of identical composition to the product of this invention. Thus FIG. 5, by comparing shear rate to viscosity given the same composition, illustrates how flow control of a paint formulation is improved by this invention.

The following tables 1–4 serve to illustrate some of the improved properties of the products of this invention (the specific product being that as disclosed immediately hereinabove) over some of the conventional clay thickening agents presently on the market. As stated above, Bentone 34 and 38 are produced and sold by the National Lead Company while the GM Bentonite Gellants used for comparison are experimental samples prepared by General Mills and presently sold under these names.

TABLE 1

Gel strength of various solvents thickened with 2% of the indicated thickeners.

| Solvent | Gel Strength (Grams)* Inventive Product | Bentone 38 |
|---|---|---|
| Dioctyl Phthalate (DOP) | 40.0 | 35.0 |
| Toluene | 137.0 | 54.4 |
| Styrene | 85.8 | 84.8 |
| Xylene | 119.4 | 103.6 |
| VM & P Naptha | 169.0 | 129.2 |
| Mineral Spirits | 154.8 | 122.8 |
| Isopropanol | No Gel | No Gel |
| Cellosolve (ethylene glycol monoethyl ether) | No Gel | No Gel |

*Force to penetrate gel with a 4-inch diameter plate at a rate of 1''/minute.

TABLE 2

Viscosity of various solvents thickened with 2% of the indicated thickeners.

| Solvent | Brookfield Viscosity* (Centipoise) Inventive Product | Bentone 38 |
|---|---|---|
| Dioctyl Phthalate (DOP) | 688 | 585 |
| Toluene | 1059 | 668 |
| Styrene | 1012 | 684 |
| Xylene | 1843 | 1003 |
| VM & P Naptha | 2884 | 1997 |
| Mineral Spirits | 2788 | 2156 |

*No. 2 spindle at 10 rpm.

TABLE 3

Viscosity and Gel Strength of Toluene Thickened With 2% of Indicated Thickeners

| Sample | Brookfield Viscosity[1] (Centipoise) | Gel Strength[2] (Grams) |
|---|---|---|
| Product | 456 | 136 |
| GM Bentonite Gellant 340 | 121 | 60 |
| GM Bentonite Gellant 380 | 310 | 85 |
| GM Bentonite Gellant 380A | 320 | 88 |

[1] No. 2 spindle at 50 rpm.
[2] Force to penetrate gel with a 4-inch diameter plate at a rate of 1''/minute.

TABLE 4

Paint Gellant Grind Time Test Results
Inventive product composite sample vs. Bentone 34 and 38 production samples as gellants in an alkyd semi-gloss formulation.

| Gellant | Sample Amount | Grind Time (min) | Grind (NS) | Consistency (K.U.) Fresh | 1 Day | 1 Week | Leveling | Sag | Gloss 60° | 20° |
| --- | --- | --- | --- | --- | --- | --- | --- | --- | --- | --- |
| None | — | 5 | 6 | 67 | 67 | 68 | 9 | 3 | 83 | 48 |
| Bentone 34 | 6 | 5 | 6 | 70 | 72 | 76 | 7 | 5 | 49 | 9 |
| Bentone 38 | 6 | 5 | 0-1 | 70 | 73 | 78 | 6 | 5 | 51 | 10 |
| Product | 6 | 5 | 6 | 71 | 75 | 77 | 6 | 5 | 46 | 8 |
| None | — | 10 | 6¾ | 68 | 58 | 69 | 9 | 3 | 80 | 40 |
| Bentone 34 | 6 | 10 | 6½ | 72 | 73 | 76 | 7 | 5 | 49 | 9 |
| Bentone 38 | 6 | 10 | 3 | 72 | 75 | 79 | 5-6 | 5-6 | 43 | 8 |
| Product | 6 | 10 | 6 | 73 | 76 | 79 | 6 | 5 | 42 | 7 |
| None | — | 20 | 6½ | 70 | 71 | 71 | 9 | 3 | 83 | 47 |
| Bentone 34 | 6 | 20 | 6½ | 80 | 82 | 83 | 7 | 5 | 58 | 12 |
| Bentone 38 | 6 | 20 | 6½ | 80 | 84 | 86 | 6-7 | 5 | 56 | 12 |
| Product | 6 | 20 | 6½ | 83 | 85 | 86 | 7-8 | 5 | 54 | 12 |

Once given the above disclosure, many other features, modifications, and improvements will become apparent to the skilled artisan. Such features, modifications and improvements are therefore considered to be a part of this invention, the scope of which is to be determined by the following claims.

We claim:

1. A process for producing a colloidal clay which comprises initially slurrying a clay material with water, commingling the slurry with steam at a pressure of about 100–500 psig and a temperature of about 300°–470°F, expanding the commingled material at a reduced pressure sufficient to form at least some colloidal particles, conducting said steam-commingled and expanded material to a holding zone and therein holding said material at a temperature of about 180°–270°F and a pressure of about 0–25 psig for a period of time sufficient to increase the amount of colloidal particles of clay formed.

2. The process of claim 1 wherein the commingling and expansion is conducted at a pressure of about 150–450 psig and a temperature of 350°–450°F.

* * * * *